E. S. Kennedy, J. Putnam & H. Smith.
Hose Coupling.

No. 122,388.  Patented Jan. 2, 1872

Witnesses:
E. Wolff.
Wm. H. C. Smith.

Inventors:
E. S. Kennedy.
J. Putnam.
H. Smith.
Per
Attorneys.

UNITED STATES PATENT OFFICE.

EDWARD S. KENNEDY, JOHN PUTNAM, AND HENRY SMITH, OF BIRMINGHAM, PENNSYLVANIA.

IMPROVEMENT IN HOSE-COUPLINGS.

Specification forming part of Design No. 122,388, dated January 2, 1872.

*To all whom it may concern:*

Be it known that we, EDWARD S. KENNEDY, JOHN PUTNAM, and HENRY SMITH, of Birmingham, (Buchanan Post Office,) in the county of Allegheny and State of Pennsylvania, have invented a new and useful Improvement in Hose-Coupling; and we do hereby declare that the following is a full, clear, and exact description thereof, which will enable others skilled in the art to make and use the same, reference being had to the accompanying drawing forming part of this specification, in which—

Figure 1:
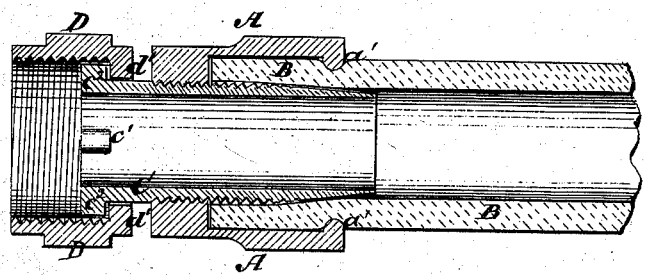
Figure 2:
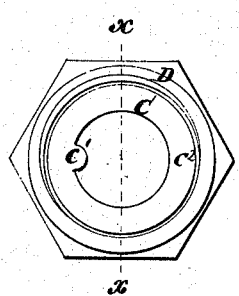

Figure 1 is a detail sectional view of our improved hose-coupling taken through the line $x$ $x$, Fig. 2. Fig. 2 is an end view of the same.

Similar letters of reference indicate corresponding parts.

Our invention consists in improving hose-couplings, as hereinafter fully described and subsequently pointed out in the claim.

A represents the collar or receptacle for the end B of the hose. The collar A is made with a rim or rib, $a'$, around the inner surface of the end into which the hose B is inserted. The interior of the collar A, toward the rib $a'$, is recessed to furnish space for the end of the hose to expand into when the inner part C of the coupling is screwed into place, and to form a shoulder against which the end edge of the hose B may rest. The inner surface of the other end of the outer part or collar A has a screw-thread cut in it to fit into the screw-thread cut in the outer surface of the inner or connecting part C. The outer surface of the inner or forward end of the part C is beveled off, as shown in Fig. 1, so as to enter the end of the base more readily and expand it, pressing it against the inner surface of the collar A and clamping it between the outer surface of the said inner part C and the rib $a'$. The inner part C has a tongue or projection, $c^1$, formed upon the inner surface of its outer end for a key-wrench to take hold of to enable the part C to be conveniently screwed in or out. D is a female nut to be screwed upon the nozzle of a hydrant, water-pipe, or street-washer to connect the hose with it. The outer end of the nut D has an inwardly-projecting flange, $d'$, formed upon it to fit against an outwardly-projecting flange, $c^2$, formed around the end of the inner part C, to swivel the said nut to the said part, so that the nut may be screwed on and off without turning the part C or twisting the hose.

In attaching a nozzle to the end of a hose the part C of the coupling may be formed as a solid part of the nozzle; or the nozzle may be screwed into the nut D. The outer surface of the collar A should be squared off to enable a wrench to take hold of said collar to hold it from turning while the inner part C is being screwed in and out. The outer surface of the nut D should also be squared off to enable a wrench to take hold of it to screw it on and off.

This construction enables a hose to be conveniently mended by any one, should it burst or cut, without its being necessary to take it to a plumber, as must be done with the ordinary construction.

Having thus described our invention, we claim as new and desire to secure by Letters Patent—

A hose-coupling, formed of the collar A, expander C, and swivel-nut D, each constructed and all applied together as and for the purpose specified.

EDWARD S. KENNEDY.
JOHN PUTNAM.
HENRY SMITH.

Witnesses:
JOHN W. KEMLER,
J. E. MILLER.

(81)